United States Patent
Bee et al.

(10) Patent No.: US 7,290,073 B2
(45) Date of Patent: Oct. 30, 2007

(54) MASTER SLAVE SERIAL BUS APPARATUS

(75) Inventors: Graham Michael Bee, Woodbridge (GB); Christian Rookes, Ipswich (GB)

(73) Assignee: Avago Technologies Fiber IP (Singapore) Pte Ltd, Singapore (SG)

( * ) Notice: Subject to any disclaimer, the term of this patent is extended or adjusted under 35 U.S.C. 154(b) by 212 days.

(21) Appl. No.: 10/836,444

(22) Filed: Apr. 30, 2004

(65) Prior Publication Data
US 2004/0221085 A1   Nov. 4, 2004

(30) Foreign Application Priority Data
Apr. 30, 2003   (EP)   ................................. 0309823

(51) Int. Cl.
*G06F 13/00*   (2006.01)
(52) U.S. Cl. .................. 710/110; 710/305; 710/306
(58) Field of Classification Search ................ 710/305, 710/306, 5, 66
See application file for complete search history.

(56) References Cited

U.S. PATENT DOCUMENTS

| | | | |
|---|---|---|---|
| 5,199,106 A * | 3/1993 | Bourke et al. ............... 710/110 |
| 5,204,949 A | 4/1993 | Yasue et al. ................. 395/200 |
| 5,276,814 A * | 1/1994 | Bourke et al. ............... 710/105 |
| 5,327,121 A | 7/1994 | Antles, II .............. 340/825.51 |
| 5,615,404 A * | 3/1997 | Knoll et al. ................... 710/62 |
| 5,632,016 A | 5/1997 | Hoch et al. ............. 395/200.02 |
| 5,761,697 A | 6/1998 | Curry et al. ................. 711/100 |
| 5,903,737 A | 5/1999 | Han |
| 6,233,635 B1 * | 5/2001 | Son .............................. 710/315 |
| 6,502,158 B1 | 12/2002 | James et al. ................. 710/311 |
| 6,510,484 B1 * | 1/2003 | Kim et al. .................... 710/314 |
| 2004/0225814 A1 * | 11/2004 | Ervin ........................... 710/305 |

FOREIGN PATENT DOCUMENTS

| | | |
|---|---|---|
| EP | 1 209 574 | 7/2002 |
| EP | 1 235 202 | 8/2002 |
| GB | 2 001 462 | 1/1979 |
| JP | 11-219338 | 10/1999 |
| JP | 11328069 | 11/1999 |
| JP | 2003030125 | 1/2003 |

OTHER PUBLICATIONS

Uk Search Report, Application No. GB 0309823.3.
Wojslaw, C. "A Primer Digitally-Controlled Potentiometers," Feb. 2000, CA.

* cited by examiner

*Primary Examiner*—Khanh Dang

(57) ABSTRACT

The present invention provides a master slave arrangement for providing communication between a master device and a slave device, the arrangement comprising: a first serial bus connecting said master device with an intermediate device and a second serial bus connecting said intermediate device with a slave device, said second serial bus comprising a data line, a clock line and one or more addressing lines, wherein said intermediate device i) interprets a request made by said master device; and (ii) sends a signal to said slave device over said one or more addressing lines to identify a memory location of said slave device to which said request is associated.

8 Claims, 4 Drawing Sheets

MASTER SLAVE SERIAL BUS APPARATUS

FIELD OF THE INVENTION

This invention relates to a serial interface, and in particular to two wire serial interfaces used to provide communications between electronic devices.

BACKGROUND OF THE INVENTION

Typically, and with reference to FIG. 1, one of the devices is designated as 'master' 10 and the other device or devices are designated as a 'slave' 20, which respond appropriately to all requests made to them from the master device. In conventional two-wire systems one of the wires 30 carries a clock signal and the other wire 40 carries data. The master device may carry out both read and write operations; in read operations a slave device will report data stored in a memory location within the slave device and in write operations the master device can update data stored within the slave device in order, for example, to alter the operation of the slave device.

In order to support compatibility and inter-operability between devices made by different manufacturers, industry standards have been developed and agreed. In the field of transceivers for datacommunications and telecommunications, agreed standards include SFF-8472 (Digital Diagnostic Monitoring Interface for Optical Transceivers, rev. 9.3, Aug. 1, 2002, published by the SFF Committee, http://www.sffcommittee.com/) which allows an extended feature set to be defined, SFF-8074i (also referred to as INF-8074I, Small Form-factor Pluggable (SFP) Transceiver Multi-Source Agreement (MSA), rev. 1.0, Sep. 14, 2000, published by the SFF Committee) which defines a serial identification interface and SFF-8053 (GBIC (Gigabit Interface Converter), rev. 5.5, Sep. 27, 2000, published by the SFF Committee).

Typically in such schemes, the master device will initiate communication with a slave device by transmitting an 8-bit signal; the first seven bits of the signal correspond to the address of the slave device and the final bit indicates whether a read or a write operation is required of the device (conventionally, a read operation is denoted by a '1' and a write operation is denoted by a '0'). Once the communication with the slave device has been established and a second 8 bit signal is sent to specify the memory location to which the read/write operation applies. If a read operation has been specified then the contents of the memory location are reported to the master device; if a write operation has been reported then a further 8 bit signal is sent to be slave device and written to the specified memory location. An inherent limitation of this method is that each slave device contains 256 bytes of information and with a 7-bit address space the maximum number of slave devices is 128. In practice, parts of the address space are reserved so that only 112 slave may be addressed. This limits the total addressable memory to 28,672 bytes.

The limits to the memory capacity of each slave device and the limit to the memory addressable by a master device pose significant issues. It may be possible to use a plurality of logical device addresses to refer to different memory areas of a single physical device but this can cause additional problems as many controllers can not address more than one logical device at the same time. Another known problem is that the implementation of the separation of read/write memory areas and read only memory areas within a single logical device can be difficult, as many devices only allow one type of memory area within a single logical device.

A number of solutions that address these problems have been proposed. In one, a specific request is sent to a reserved logical device address that causes the slave device to toggle between memory areas that are to be addressed (this is implemented within SFF-8472 as the Address Change function). This method is not generally supported and is error-prone and slower than conventional logic addressing. Another approach is to attach one or more memory devices (either physical memory or logical memory devices) to the serial interface bus. While it is not possible for the slave device to write directly to an individual memory device without preventing the master from reading data from that memory device (although this may be achieved by adding dedicated serial bus connections for each of the memory devices), it is possible for the master device to write data to all of the memory devices, with the slave device storing a master copy of the data so that any data that is incorrectly overwritten can be corrected before a subsequent read operation.

Another known technique (which is applicable in the case that the slave device is some form of micro-controller) is to not connect the serial interface of the micro-controller but to connect the clock and data lines to two general purpose digital input/output lines of the micro-controller. The inputs of the clock and data lines can be interpreted by the software and/or firmware of the micro-controller, which enables multiple logical devices to be addressed, and to a greater extent than is possible with the Address Call function, or other similar functions. The main disadvantage of such an approach is that a significant amount of processor time is used in the implementation of the method.

SUMMARY OF THE INVENTION

According to a first aspect of the invention there is provided a serial interface for providing communication between a master device and a slave device, the serial interface comprising: a first serial bus connecting said master device with an intermediate device and a second serial bus connecting said intermediate device with a slave device, said second serial bus comprising a data line, a clock line and one or more addressing lines, wherein said intermediate device (i) interprets a request made by said master device; and (ii) sends a signal to said slave device over said one or more addressing lines to identify a memory location of said slave device to which said request is associated.

The master device request may comprise a request to write data to a slave device memory location or alternatively said master device request may comprise a request to read data from a slave device memory location. The one or more addressing lines may comprise flag lines.

According to a second aspects of the invention there is provided a master slave arrangement for providing communication between a master device and a slave device, the serial interface comprising a serial bus connecting said master device with said slave device, said serial bus comprising a data line and a clock line, said slave device comprising a microprocessor, a plurality of memory locations, a first input port to receive the data line and a second input port to receive the clock line, wherein said slave device monitors one or both of said first input port and said second input port and in response to the detection of a predetermined signal on one or both of said first input port and said second input port to detect a request from said master device addressed to one or more memory locations associated with the slave device.

The master slave arrangement preferably further comprises a plurality of slave devices. The master device request may comprise a request to write data to a slave device memory location. The master slave arrangement of claim 5 wherein said master device request comprises a request to read data from a slave device memory location.

According to a third aspect of the invention there is provided a master slave arrangement for providing communication between a master device and a slave device, the serial interface comprising a serial bus connecting said master device with said slave device, said serial bus comprising a data line and a clock line, said slave device comprising a microprocessor, a plurality of memory locations, a first input port and a third input port to receive the data line and a second input port and a fourth input port to receive the clock line, wherein in response to the detection of a predetermined signal on one or both of said first input port and said second input port said slave device monitors one or both of said third input port and said fourth input port to detect a request from said master device addressed to one or more memory locations associated with the slave device.

The master slave arrangement preferably further comprises a plurality of slave devices. The master device request may comprise a request to write data to a slave device memory location. The master slave arrangement of claim 5 wherein said master device request comprises a request to read data from a slave device memory location.

While the invention is defined by the claims appended hereto, additional understanding of the invention can be obtained by referencing the following detailed description of preferred embodiments and the appended drawings.

DETAILED DESCRIPTION OF THE PRESENT INVENTION

Figure 1:
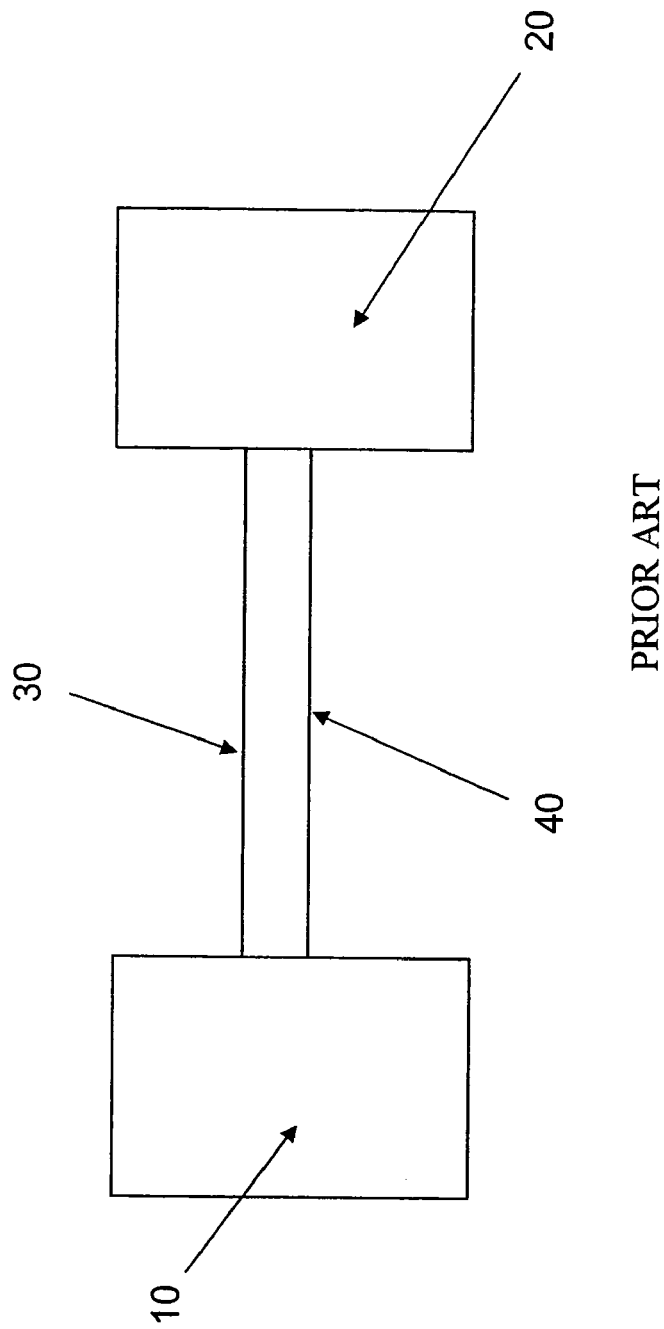
FIG. 1 shows a schematic depiction of a known master-slave arrangement.
Figure 2:
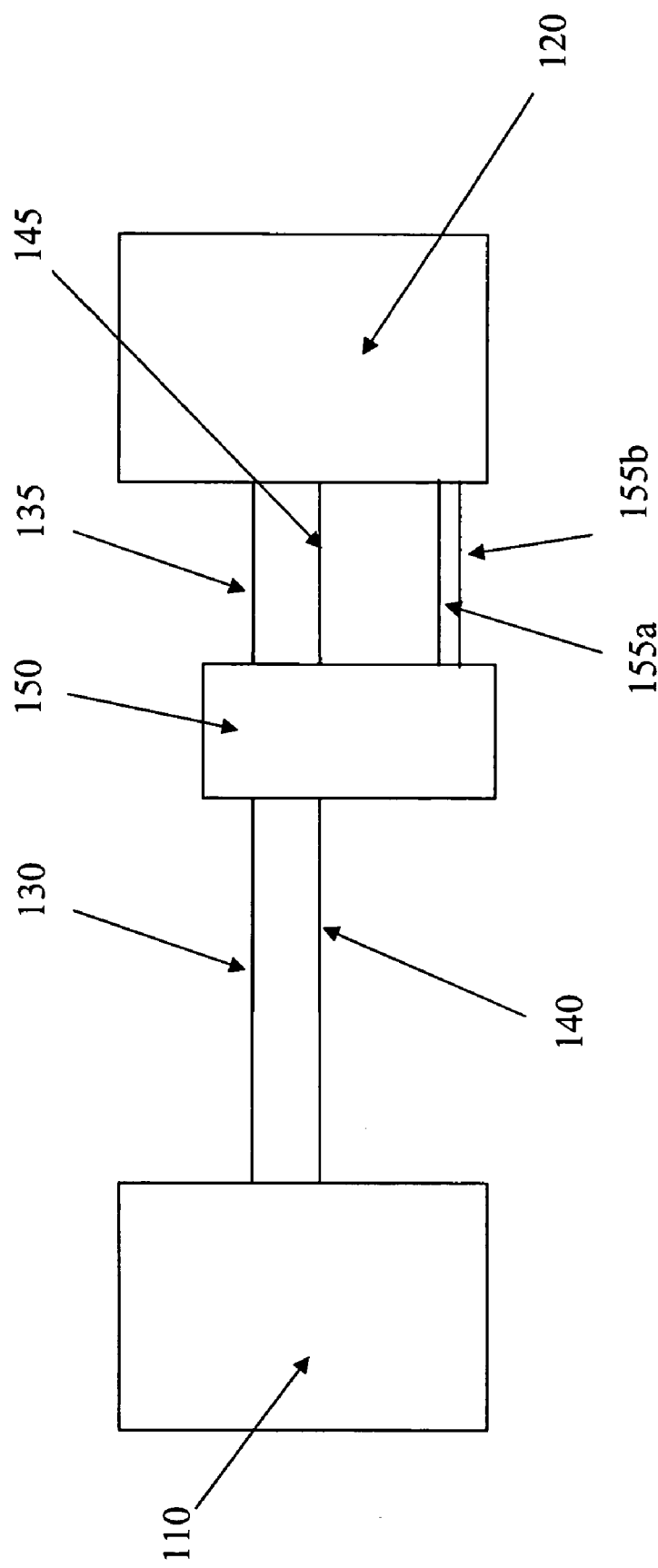
FIG. 2 shows a schematic depiction of a master-slave arrangement according to a first embodiment of the present invention.

FIG. 2 shows a schematic depiction of a master-slave arrangement according to a first embodiment of the present invention. Rather than a direct master-slave connection, the master device 110 is in communication with a pre-processor 150, with data being communicated between the master and the pre-processor using first serial clock 130 and data 140 lines. The pre-processor is also in communication with the slave device 120 via second serial clock 135 and data 145 lines. There is additionally provided one or more addressing lines 155, which are connected between the pre-processor and the slave device.

Instead of direct communication between the master 110 and the slave 120, the master device 110 communicates with the pre-processor 150. The pre-processor decodes and interprets the memory location requested by the master device to recognise a request addressed to more than one logical device address. The pre-processor then sends the request to the IC (or ICs) corresponding to the requested logical addresses.

The request is relayed using a private serial bus 135, 145, using one or more additional I/O lines 155a, 155b, . . . , which may be a flag line for example, to indicate which block of memory the request is intended for. The number of additional I/O lines will limit the capacity of the pre-processor to process requests destined for multiple logical addresses with, for example, multiple flag lines being used to generate a binary code. This approach has the advantage of allowing more device addresses to be accessed without implementing Address Change or demanding excessive overhead from the microcontroller. The pre-processor functions may be implemented in hardware or in firmware or software.

This approach is not without disadvantages, as an additional IC is required (the pre-processor), and the timing requirements may be problematic. For example, delays will occur during read requests because the pre-processor must first receive the request from the master device, relay it to the target device via the private serial bus and flag lines and then await a response. Only once these steps are complete can the pre-processor relay the response to the master device. If this delay is too long, it may exceed the maximum response time allowed by the serial bus protocol.

Figure 3:
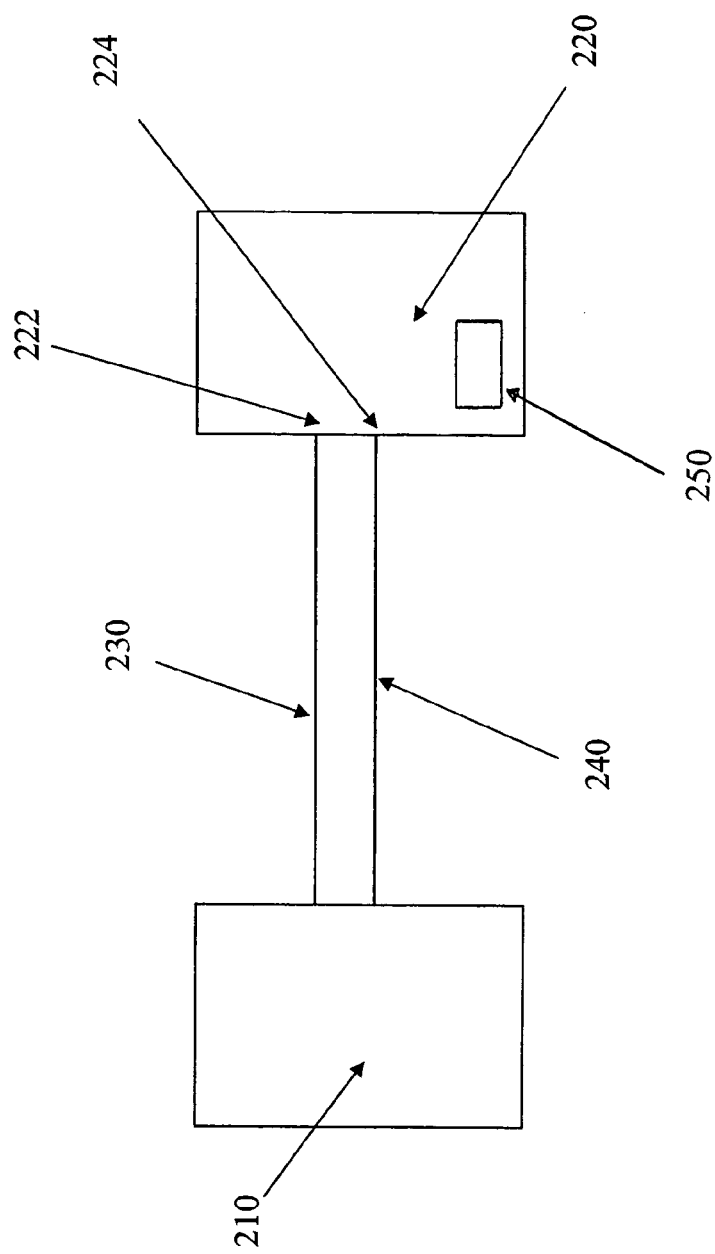
FIG. 3 shows a schematic depiction of a second embodiment of a master-slave arrangement according to the present invention and FIG. 4 shows a schematic depiction of an alternative arrangement of the embodiment of the present invention shown in FIG. 3.

FIG. 3 shows a schematic depiction of a second embodiment of a master-slave arrangement according to the present invention. Master device 210 is connected to slave device 220 via serial clock line 230 and data line 240. The slave device 220 comprises a microcontroller 250 that monitors one or more I/O lines and initiates an interrupt request in response to a particular state, or state sequence, at one of the monitored I/O lines. The interrupt causes the operations of the microcontroller 250 to be halted and an interrupt-handling routine to be started.

For example, referring to FIG. 3, the slave device 220 may have an I/O line with appropriate interrupt capabilities connected to the serial data line 240. The interrupt may cause the slave device to stop what it is doing and attend to the serial interface whenever there is a falling edge, for example, on the serial data line 240. The slave device interrupt routine can then poll the I/O port to detect whether or not there is a valid start condition and if not it can return from the interrupt routine to its program.

If there is a valid start condition, the slave device will need to monitor the logical device address that follows the start condition to determine whether the read or write request that follows is addressed to a logical address associated with the slave device 220. If this is not the case then the slave device can return from the interrupt to continue execution of its main program. If the request is addressed to the slave device 220 then the slave device will respond accordingly to the request.

One of the advantages of this method is that there is a lower overhead on the slave device as it is only necessary to poll the data line when a valid start condition is detected. Furthermore, like other firmware—or software-implemented interfaces, it allows multiple logical device addresses to be used on a single microcontroller 250, and allows fine control of allowed write-access.

A disadvantage of the method is that when communication is open for another device on the same serial bus, there is a moderate overhead on every cycle of the data line because the interrupt routine is triggered whenever the data line goes low to allow polling for the start condition.

The impact of this disadvantage may be mitigated by the use of a different combination of states and/or state transitions to cause the slave device to begin polling the data I/O line.

Figure 4:
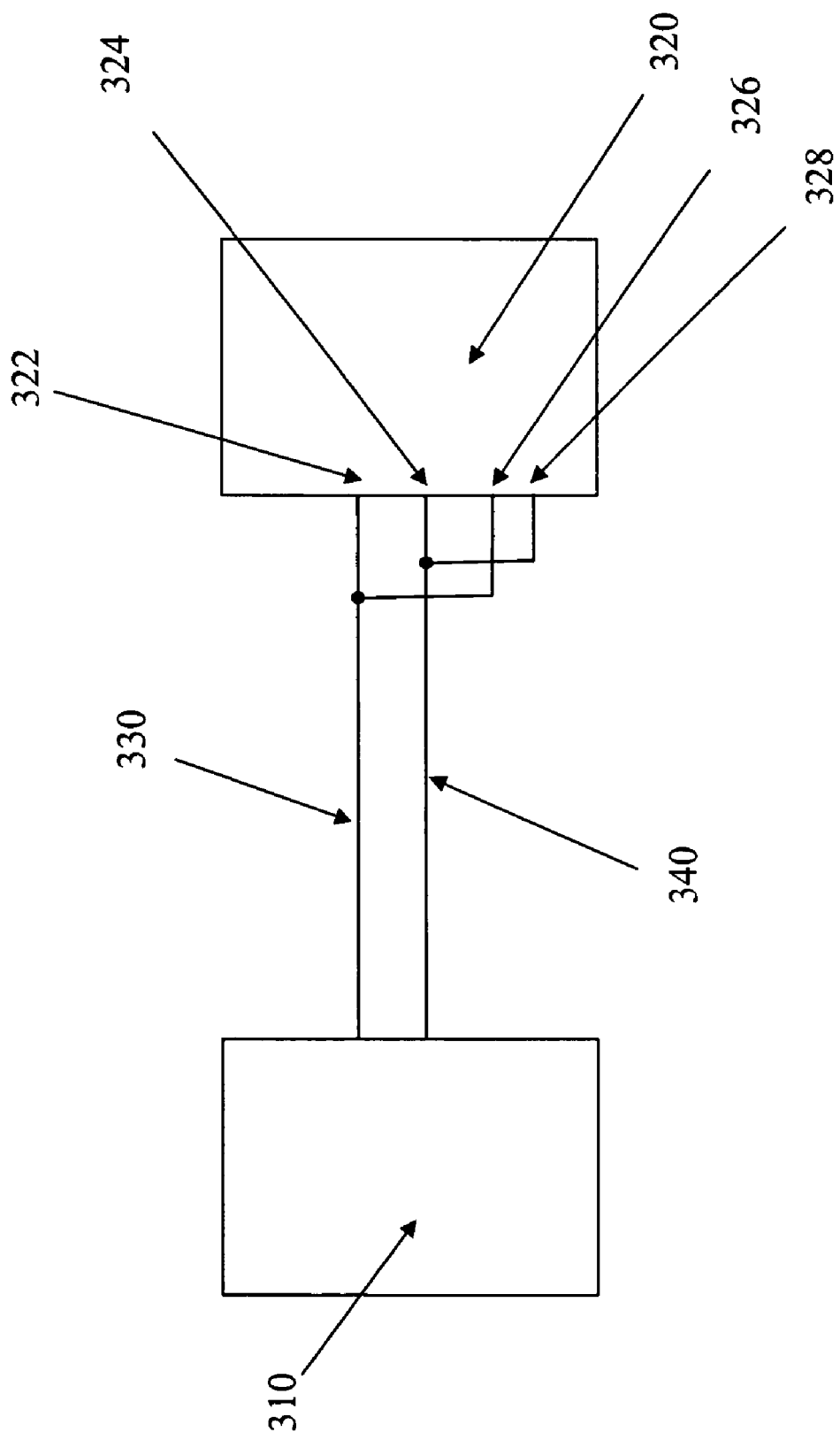

FIG. 4 shows a schematic depiction of an alternative arrangement of the embodiment of the present invention shown in FIG. 3. As in the embodiment described above with reference to FIG. 3, the master device 310 is connected to a slave device 320 via serial clock line 330 and serial data line 340. The serial clock line 330 is connected to first I/O line 322 and the serial data line 340 is connected to second I/O line 324. As described above, the I/O lines 322, 324 are general purpose I/O lines that may be accessed by the microcontroller, and preferably are interrupt driven I/O lines, as described above. Additionally, the serial data and clock lines are connected in parallel to the data line and clock line connections 326 and 328 respectively, of a dedicated hardware interface. Now the slave device is only issued with an interrupt when a start or stop condition is detected by the hardware interface connections 326, 328. The firmware interrupt routine will then either begin to poll the two serial bus lines via the general-purpose I/O ports 322, 324 or it will use further interrupts on the general-purpose I/O ports 322, 324 to detect rising edges on the serial clock line 330. Once the destination address has been read, if the slave device is not the intended recipient of the message it can return from the interrupt routine to the main program. If the slave device is the intended recipient, it can process the message as described above with reference to FIG. 3.

This approach has a number of advantages, one of which is that the slave device overhead is reduced by calling the interrupt routine only for genuine start or stop conditions, as detected by the hardware interface, not once or more per data or clock cycle. If stop conditions cause an interrupt, then the interrupt routine may be terminated very quickly. The arrangement shown in FIG. 4 enables multiple logical device addresses to be supported by a single microcontroller, allowing large amounts of memory to be addressed by the microcontroller. It even allows a single microcontroller, appropriately programmed, to support both Address Change and multiple address modes of operation. Fine control of write-protection to byte, or even to bit, level resolution is made possible. It also possible to port the same firmware from one microcontroller to another microcontroller having similar functionality, but incorporating, for example, larger memory or a faster microprocessor. The solution can also be implemented on a single microcontroller IC.

However, this solution is only possible if the microcontroller supports partial activation of its serial interface hardware and generation of the appropriate interrupt condition. An example of such a microcontroller chip is the Microchip PIC18LF452 and it will be readily understood that other devices with similar functionality may be used.

The foregoing disclosure includes the best mode devised by the inventor for practicing the invention. It is apparent, however, that several variations in the present invention may be conceivable by one skilled in the art. Inasmuch as the foregoing disclosure is intended to enable one skilled in the pertinent art to practice the instant invention, it should not be construed to be limited thereby, but should be construed to include such aforementioned variations.

The invention claimed is:

1. A master slave apparatus for providing communication between a master device and a slave device, said apparatus comprising a serial interface comprising a serial bus connecting said master device with said slave device, wherein said serial bus comprises a data line and a clock line, wherein said slave device comprises a microprocessor, a plurality of memory locations, a first input port to receive the data line and a second input port to receive the clock line, wherein said microprocessor, while executing a program, monitors one or both of said first input port and said second input port and in response to the detection of a predetermined signal on one or both of said first input port and said second input port to commence an interrupt routine to detect a request from said master device comprising a logical address to determine if the logical address is associated with the memory locations of said slave device and if not to return said slave device to continue execution of said program.

2. The master slave apparatus of claim 1 further comprising a plurality of slave devices.

3. The master slave apparatus of claim 1 wherein said master device request comprises a request to write data to a slave device memory location.

4. The master slave apparatus of claim 1 wherein said master device request comprises a request to read data from a slave device memory location.

5. A master slave apparatus for providing communication between a master device and a slave device, said apparatus comprising a serial interface comprising a serial bus connecting said master device with said slave device, wherein said serial bus comprises a data line and a clock line, wherein said slave device comprises a microprocessor, a plurality of memory locations, a first input port and a third input port to receive the data line and a second input port and a fourth input port to receive the clock line, wherein, in response to the detection of a predetermined signal on one or both of said first input port and said second input port, said microprocessor, while executing a program, monitors one or both of said third input port and said fourth input port to detect a request from said master device comprising a logical address to determine if the logical address is associated with the memory locations of said slave device and if not to return said slave device to continue execution of said program.

6. The master slave apparatus of claim 5 further comprising a plurality of slave devices.

7. The master slave apparatus of claim 5 wherein said master device request comprises a request to write data to a slave device memory location.

8. The master slave apparatus of claim 5 wherein said master device request comprises a request to read data from a slave device memory location.

* * * * *